(12) United States Patent
Gemin (10) Patent No.: US 10,968,765 B2
(45) Date of Patent: Apr. 6, 2021

(54) POWER SYSTEM WITH A COORDINATED POWER DRAW

(71) Applicant: General Electric Company, Schenectady, NY (US)

(72) Inventor: Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 16/208,978

(22) Filed: Dec. 4, 2018

(65) Prior Publication Data

US 2020/0173300 A1   Jun. 4, 2020

(51) Int. Cl.
| | |
|---|---|
| *F01D 13/00* | (2006.01) |
| *F02C 9/00* | (2006.01) |
| *F02K 3/04* | (2006.01) |
| *F02C 3/10* | (2006.01) |
| *B64D 27/02* | (2006.01) |
| *B64D 27/10* | (2006.01) |
| *B63H 21/20* | (2006.01) |

(Continued)

(52) U.S. Cl.
CPC ............ *F01D 13/003* (2013.01); *B60L 50/10* (2019.02); *B63H 21/20* (2013.01); *B64D 27/02* (2013.01); *B64D 27/10* (2013.01); *F01D 15/10* (2013.01); *F02C 3/10* (2013.01); *F02C 9/00* (2013.01); *F02K 3/04* (2013.01); *B60L 2200/10* (2013.01); *B60L 2200/32* (2013.01); *B63H 2021/207* (2013.01); *B64D 2027/026* (2013.01); *F05D 2220/323* (2013.01); *F05D 2270/05* (2013.01); *F05D 2270/20* (2013.01); *F05D 2270/332* (2013.01); *F05D 2270/42* (2013.01)

(58) Field of Classification Search
CPC ..... F02C 3/10; F02C 9/00; F02K 3/04; B64D 27/02; B64D 27/10; B64D 2027/026; B63H 2021/207; B63H 21/20; F05D 2270/05; F05D 2270/20; F05D 2270/332; F05D 2270/42; F05D 2220/323; B60L 2200/10; B60L 2200/32; B60L 50/10; F01D 13/003; F01D 15/10
USPC .......................................................... 701/22
See application file for complete search history.

(56) References Cited

U.S. PATENT DOCUMENTS

| | | |
|---|---|---|
| 4,470,257 A | 9/1984 | Wescott |
| 6,230,479 B1 | 5/2001 | Kawamura et al. |
| 7,194,863 B2 | 3/2007 | Ganev et al. |

(Continued)

*Primary Examiner* — Atul Trivedi
(74) *Attorney, Agent, or Firm* — Dority & Manning, P.A.

(57) ABSTRACT

A method includes receiving a command to operate a power load of a power system at a command output power while operating the power load at a reference output power; operating a gas turbine engine of the power system in a maximum regulator mode to increase a power generation of the gas turbine engine when the command output power is greater than the reference output power or in a minimum regulator mode to decrease the power generation of the gas turbine engine when the command output power is less than the reference output power; and coordinating an electric machine power draw from the gas turbine engine with a change in power generation of the gas turbine engine to maintain a rotational speed parameter of the gas turbine engine substantially constant while operating the gas turbine engine in the maximum regulator mode or in the minimum regulator mode.

20 Claims, 5 Drawing Sheets

(51) Int. Cl.
  *F01D 15/10*  (2006.01)
  *B60L 50/10*  (2019.01)

(56) References Cited

U.S. PATENT DOCUMENTS

| | | | |
|---|---|---|---|
| 7,615,881 B2 | 11/2009 | Halsey et al. | |
| 9,187,093 B1 | 11/2015 | Sujan | |
| 9,574,511 B2 | 2/2017 | Kim et al. | |
| 10,240,477 B2* | 3/2019 | Ettridge | F01D 25/24 |
| 10,633,104 B2* | 4/2020 | Miller | B64D 27/16 |
| 2010/0100300 A1* | 4/2010 | Brooks | F02B 37/18 |
| | | | 701/102 |
| 2014/0245748 A1* | 9/2014 | Anghel | F02C 7/36 |
| | | | 60/783 |
| 2016/0023773 A1* | 1/2016 | Himmelmann | H02M 5/458 |
| | | | 60/778 |
| 2016/0222816 A1 | 8/2016 | Chen et al. | |
| 2017/0275009 A1* | 9/2017 | Huang | B64D 27/10 |
| 2017/0297695 A1 | 10/2017 | Schaeffer et al. | |
| 2018/0073441 A1* | 3/2018 | Cai | F02C 9/52 |
| 2018/0215462 A1* | 8/2018 | Fenny | B64D 31/00 |
| 2018/0281931 A1* | 10/2018 | Miller | B64C 21/06 |
| 2018/0304753 A1* | 10/2018 | Vondrell | B64C 21/06 |
| 2018/0305036 A1* | 10/2018 | Vondrell | H02K 7/1823 |
| 2018/0334258 A1* | 11/2018 | Vondrell | H02K 16/04 |
| 2018/0339780 A1* | 11/2018 | Barone | B64D 27/24 |
| 2018/0354632 A1* | 12/2018 | Hon | B64D 27/24 |
| 2018/0354635 A1* | 12/2018 | Wagner | B64D 27/10 |
| 2018/0357840 A1* | 12/2018 | Gansler | B64D 35/08 |
| 2018/0370646 A1* | 12/2018 | Hon | F02C 6/14 |
| 2018/0372003 A1* | 12/2018 | Hon | B64D 27/24 |
| 2018/0372588 A1* | 12/2018 | Hon | G01M 15/02 |
| 2019/0001955 A1* | 1/2019 | Gansler | B64D 27/24 |
| 2019/0002113 A1* | 1/2019 | Gansler | B64D 35/08 |
| 2019/0002116 A1* | 1/2019 | Gansler | B64D 27/24 |
| 2019/0002117 A1* | 1/2019 | Gansler | F01D 21/00 |
| 2019/0003397 A1* | 1/2019 | Gansler | F02C 6/14 |
| 2019/0017409 A1* | 1/2019 | Yardibi | F02C 9/00 |
| 2019/0031319 A1* | 1/2019 | Calkins | B64C 11/303 |
| 2019/0061969 A1* | 2/2019 | Beauchesne-Martel | F01D 17/16 |
| 2019/0063331 A1* | 2/2019 | Beauchesne-Martel | F02K 3/04 |
| 2019/0063334 A1* | 2/2019 | Graham | F02C 7/04 |
| 2019/0165708 A1* | 5/2019 | Smith | H02P 9/04 |
| 2019/0186288 A1* | 6/2019 | Jastrzembowski | F01D 21/003 |
| 2019/0264619 A1* | 8/2019 | Graham | F02C 7/232 |
| 2020/0003115 A1* | 1/2020 | Jones | F02K 3/062 |
| 2020/0080475 A1* | 3/2020 | Baladi | F02C 3/04 |

\* cited by examiner

POWER SYSTEM WITH A COORDINATED POWER DRAW

FIELD

The present subject matter relates generally to a power system utilizing a gas turbine engine to generate electrical power for a power load, and a method for operating the same.

BACKGROUND

Certain power systems include a gas turbine engine driving an electrical machine to generate electrical power to drive a power load. For example, when the power system is a propulsion system, the power load may be an electrical propulsion engine. Further, with such a configuration, during operation of the propulsion system it is not uncommon for the electrical propulsion engine to require different amounts of electrical power based on e.g., thrust needs for a vehicle including the propulsion system. For example, the variations in the amount of electrical power required for the electrical propulsion engine may result from the different operating conditions of the vehicle including the propulsion system (such as takeoff, climb, cruise, step-climb, descent, etc. when the vehicle is an aeronautical vehicle).

As noted, the electrical power is drawn from the gas turbine engine driving an electric machine. The inventors of the present disclosure have found that varying a power draw from the gas turbine engine may create speed droops within the gas turbine engine, which may lead to less efficient operation, and in extreme cases stall. Accordingly, a power system, and method for operating a power system, for providing a desired amount of electrical power for a power load of the power system without negatively affecting the gas turbine engine would be useful.

BRIEF DESCRIPTION

Aspects and advantages of the invention will be set forth in part in the following description, or may be obvious from the description, or may be learned through practice of the invention.

In one exemplary aspect of the present disclosure, a method is provided for operating a power system including a gas turbine engine, an electric machine rotatable with the gas turbine engine, and a power load driven at least in part by electrical power generated by the electric machine. The method includes receiving a command to operate the power load at a command output power while operating the power load at a reference output power; operating the gas turbine engine in a maximum regulator mode to increase a power generation of the gas turbine engine when the command output power is greater than the reference output power or in a minimum regulator mode to decrease the power generation of the gas turbine engine when the command output power is less than the reference output power; and coordinating an electric machine power draw from the gas turbine engine with a change in power generation of the gas turbine engine to maintain a rotational speed parameter of the gas turbine engine substantially constant while operating the gas turbine engine in the maximum regulator mode or in the minimum regulator mode.

In certain exemplary aspects the command output power is greater than the reference output power.

For example, in certain exemplary aspects the reference output power is a power level less than about 25% of a maximum output power of the power load, and wherein the command output power of the power load is a power level greater than about 75% of a maximum output power of the power load.

In certain exemplary aspects operating the gas turbine engine in the maximum regulator mode or in the minimum regulator mode includes operating the gas turbine engine in the maximum regulator mode, and wherein operating the gas turbine engine in the maximum regulator mode to increase the power generation of the gas turbine engine includes operating the gas turbine engine to a maximum pressure regulator, to a maximum temperature regulator, or both.

In certain exemplary aspects operating the gas turbine engine in the maximum regulator mode or in the minimum regulator mode includes operating the gas turbine engine in the maximum regulator mode, and wherein operating the gas turbine engine in the maximum regulator mode to increase the power generation of the gas turbine engine includes operating the gas turbine engine to achieve the fastest transient to power.

In certain exemplary aspects the power load is an electric propulsor driven by the electric machine, and wherein coordinating the electric machine power draw from the gas turbine engine with the change in power generation of the gas turbine engine includes providing electrical power generated from the electric machine to the electric propulsor for driving the electric propulsor and generating thrust.

In certain exemplary aspects receiving the command to operate the power load at the command output power includes receiving data from a throttle of a vehicle including the power system.

For example, in certain exemplary aspects the vehicle is an aeronautical vehicle, wherein the power system is a propulsion system for the aeronautical vehicle, wherein the power load is an electric propulsor, and wherein the gas turbine engine is one of a turboshaft engine, a turbojet engine, a turbine fan engine, or a turboprop engine.

For example, in certain exemplary aspects the vehicle as a nautical vehicle, wherein the power system is a propulsion system for the nautical vehicle, wherein the gas turbine engine is a turboshaft engine, and wherein the power load is an electric propeller.

In certain exemplary aspects the power load is a military power load.

In certain exemplary aspects the power system is an auxiliary power unit of an aeronautical vehicle, wherein the gas turbine engine is a turboshaft engine, and wherein the power load is a system of the aeronautical vehicle.

In certain exemplary aspects coordinating the electric machine power draw from the gas turbine engine with the change in power generation of the gas turbine engine to maintain the rotational speed parameter of the gas turbine engine substantially constant includes coordinating the power draw from the gas turbine engine through a feedback loop.

In certain exemplary aspects the command output power is greater than the reference output power, and wherein the method further includes receiving data indicative of the power load achieving the command output power; and ceasing operation of the gas turbine engine in the maximum regulator mode or in the minimum regulator mode in response to receiving data indicative of the power load achieving the command output power.

In certain exemplary aspects the rotational speed parameter is indicative of a rotational speed of one or more shafts of the gas turbine engine.

In an exemplary embodiment of the present disclosure, a power system for a vehicle is provided. The power system includes a gas turbine engine; an electric machine rotatable with the gas turbine engine, the gas turbine engine configured to rotate the electric machine to generate electrical power during at least certain operations; a power load electrically coupled to the electric machine; and a controller operable with the gas turbine engine, the electric machine, and the power load, the controller including one or more processors and a data storage, the data storage storing instructions that when executed by the one or more processors cause the controller to perform functions. The functions include receiving a command to operate the power load at a command output power while operating the power load at a reference output power; operating the gas turbine engine in a maximum regulator mode to increase a power generation of the gas turbine engine when the command output power is greater than the reference output power or in a minimum regulator mode to decrease the power generation of the gas turbine engine when the command output power is less than the reference output power; and coordinating an electric machine power draw from the gas turbine engine with a change in power generation of the gas turbine engine to maintain a rotational speed parameter of the gas turbine engine substantially constant while operating the gas turbine engine in the maximum regulator mode or in the minimum regulator mode.

In certain exemplary embodiments the command output power is greater than the reference output power.

For example, in certain exemplary embodiments the reference output power is a power level less than about 25% of a maximum output power of the power load, and wherein the command output power of the power load is a power level greater than about 75% of a maximum output power of the power load.

In certain exemplary embodiments operating the gas turbine engine in the maximum regulator mode or in the minimum regulator mode includes operating the gas turbine engine in the maximum regulator mode, and wherein operating the gas turbine engine in the maximum regulator mode to increase the power generation of the gas turbine engine includes operating the gas turbine engine to a maximum pressure regulator, to a maximum temperature regulator, or both.

In certain exemplary embodiments receiving the command to operate the power load at the command output power includes receiving data from a throttle of a vehicle including the power system.

For example, in certain exemplary embodiments the vehicle is an aeronautical vehicle, wherein the power system is a propulsion system for the aeronautical vehicle, wherein the power load is an electric propulsor, and wherein the gas turbine engine is one of a turboshaft engine, a turbojet engine, a turbine fan engine, or a turboprop engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within an engine or vehicle, and refer to the normal operational attitude of the engine or vehicle. For example, with regard to an engine, forward refers to a position closer to an engine inlet and aft refers to a position closer to an engine nozzle or exhaust.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As will be explained with reference to the figures below, the present disclosure generally relates to a method for operating a power system having a gas turbine engine, an electric machine rotatable with the gas turbine engine, and a power load driven at least in part by the electric power generated by the electric machine. For example, the gas turbine engine may be a turboshaft engine, turbojet engine, etc. coupled to the electric generator, with the electric generator configured to convert rotational energy of the gas turbine engine into electrical power. In such a manner, the electric generator may extract, or draw, power from the gas turbine engine.

In certain exemplary aspects of the present disclosure, the method may receive a command to operate the power load at a command output power while operating the power load at a reference the power. In certain aspects, the power load may be an electric propulsor or other system. Further, the command output power may be a relatively high output power, while the reference output power may be a relatively low amount of power. For example, for exemplary aspects wherein the power load is a propulsor, the method may receive a command to operate the propulsor at full power to generate maximum thrust while operating the propulsor at an idle or cruise output power.

In response to the above command, the method may operate the gas turbine engine in a maximum regulator mode to increase a power generation gas turbine engine, and further may coordinate an electric machine power draw from the gas turbine engine (i.e., the amount of power extracted from the gas turbine engine with the electric machine) with the increase in power generation of the gas turbine engine to maintain a rotational speed parameter of the gas turbine engine substantially constant while operating the gas turbine engine in the maximum regulator mode. In such a manner, the method may reduce or eliminate a rotational speed dip or droop as a result of receiving the command to operate the power load at the command output power while operating the power load at the reference output power. In such a manner, the method may achieve the command output power for the power load more quickly and in a more efficient manner.

Figure 1:
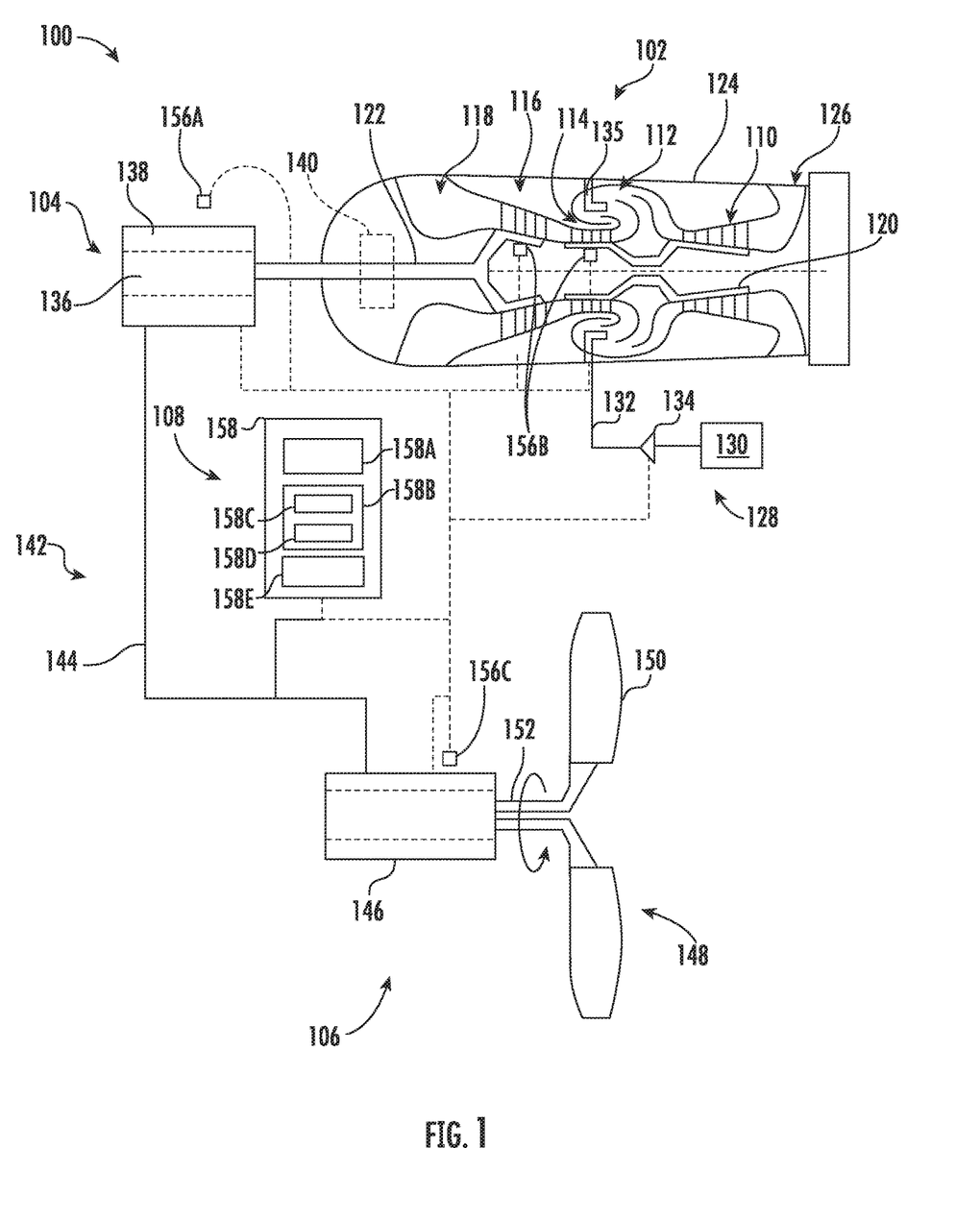
FIG. 1 is a schematic view of a power system in accordance with an exemplary embodiment of the present disclosure.

Referring now to the drawings, wherein identical numerals indicate the same elements throughout the figures, FIG. 1 provides a schematic view of a power system 100 in accordance with an exemplary aspect of the present disclosure. For the exemplary embodiment depicted in FIG. 1, the power system 100 is generally configured as a propulsion system. Moreover, the exemplary power system 100, or rather propulsion system, generally includes a gas turbine engine 102, an electric machine 104 rotatable with the gas turbine engine 102, a power load 106 driven at least in part by electrical power generated by the electric machine 104, and a control system 108 operable with the gas turbine engine 102, electric machine 104, and power load 106.

Referring first to the gas turbine engine 102, the exemplary gas turbine engine 102 depicted is configured as a turboshaft engine. The turboshaft engine generally includes a compressor section having a compressor 110; a combustion section including a reverse flow combustor 112; a turbine section including a high pressure turbine 114 and a low pressure turbine 116; and an exhaust section 118. The compressor 110 and the high pressure turbine 114 are coupled through a first shaft 120, and the low pressure turbine 116 is coupled to a second shaft 122, sometimes also referred to as an output shaft or power turbine shaft. The compressor section, combustion section, turbine section, and exhaust section 118 are each arranged in serial flow order and are enclosed, for the embodiment depicted, within an outer casing 124. Notably, the outer casing 124 defines an inlet 126 to the compressor section. The gas turbine engine 102 is further operable with a fuel delivery system 128 including a fuel tank 130, one or more fuel lines 132, and a fuel pump 134. The fuel delivery system 128 may provide a flow fuel to one or more fuel nozzles 135 of the combustion section.

During operation of the turboshaft engine, air may be received through the inlet 126 and compressed through a plurality sequentially arranged compressor rotor blades of the compressor 110 of the compressor section. The compressed air from the compressor section is provided to the reverse flow combustor 112 of the combustion section, wherein the compressed air is mixed with fuel from the fuel delivery system 128 and combusted to generate combustion gases. The combustion gases are provided to the high pressure turbine 114 wherein energy is extracted through a first set of sequentially arranged turbine rotor blades to create rotational power for driving compressor section through the first shaft 120. From the high pressure turbine 114, the combustion gases flow through the low pressure turbine 116, wherein an additional amount of energy is extracted through a second set of sequentially arranged turbine rotor blades, in the form of rotational energy transfer to the second shaft 122.

As noted above, the power system 100 further includes the electric machine 104. The electric machine 104 generally includes a rotor 136 and a stator 138, with the rotor 136 coupled to, or otherwise rotatable with, the second shaft 122 of the gas turbine engine 102. In such a manner the rotor 136 may be driven by the gas turbine engine 102. As depicted in phantom, in at least certain exemplary embodiments, the gas turbine engine 102, the electric machine 104, or both, may include a gearbox 140 for varying a rotational speed of the second shaft 122 relative to the rotor 136 of the electric machine 104. The electric machine 104 may include any suitable electric machine configuration or technology that facilitates extraction of power from the gas turbine engine 102, or more specifically that facilitates conversion of rotational energy from the gas turbine engine 102 to electrical power.

It will be appreciated, however, that the exemplary turboshaft engine depicted in FIG. 1 is provided by way of example only. In other exemplary embodiments, the gas turbine engine 102 may be configured in any other suitable manner. For example, in other exemplary embodiments, the gas turbine engine 102 may include any other suitable number or configuration of compressors, turbines, shafts, etc. Further, the gas turbine engine 102 may include any other suitable combustor, arrangement of fuel nozzles 135, fuel delivery system 128, etc. Further, still, although depicted as a turboshaft engine for the embodiment of FIG. 1, in other embodiments, the gas turbine engine 102 may instead be any other suitable gas turbine engine 102, such as a turbofan engine, a turboshaft engine, turbojet engine, turboprop engine, a land-based gas turbine engine 102, an aeroderivative gas turbine engine 102, etc. Moreover, although the exemplary electric machine 104 is depicted outside, e.g., the casing 124 of the gas turbine engine 102, in other embodiments, the electric machine 104 may be integrated within the gas turbine engine 102. For example, in other embodiments, the electric machine 104 may be driven by an accessory gearbox of the gas turbine engine 102, may be a tip-mounted electric machine 104 (wherein the rotor is coupled to the radially outer ends of a plurality of rotor blades, and the stator is coupled to, e.g., the casing 124), etc.

Referring still to FIG. 1, as also noted above, the power system 100 further includes the power load 106. As is shown, the power load 106 is electrically coupled to the electric machine 104 for receiving electrical power from the electric machine 104. More specifically, the power load 106 is electrically coupled to the electric machine 104 through a power distribution bus 142. The power distribution bus 142 may include any suitable form or configuration of electric lines 144, power electronics (not shown), etc. for transferring and optionally conditioning electrical power from the electric machine 104 to the power load 106.

Further, for the embodiment shown the power load 106 is configured as a propulsor, and more specifically, is configured as an electric propulsor. The electric propulsor generally includes an electric motor 146 and a propeller 148. The propeller 148 includes a plurality propeller blades 150 and a propeller shaft 152, with the plurality of propeller blades 150 coupled to the propeller shaft 152. The propeller shaft 152 is further coupled to the electric motor 146, such that the electric motor 146 may drive the propeller shaft 152 and rotate the plurality of propeller blades 150. It will be appreciated, that as used herein, the term "propeller" refers generally to any type or configuration of propeller, fan, or other rotatable device that generates thrust for a vehicle, or otherwise propels a vehicle. Although depicted as a direct drive electric propulsor, in other embodiments, the electric propulsor may include, e.g., a gearbox for varying a rotational speed of the propulsor relative to the electric machine 104. Additionally, in other embodiments, the electric propulsor may have other components not depicted herein (e.g., a nacelle, inlet and/or outlet guide vanes, a pitch change device, etc.).

As is also depicted in FIG. 1, the power system 100 includes a control system 108. The control system 108 generally includes a controller 158 and a plurality of sensors 156. Specifically, for the embodiment shown, the plurality of sensors 156 includes an electric machine sensor 156A for sensing data indicative of one or more parameters of the electric machine 104 (such as rotational speed, power generation, power extraction, temperature, etc.); gas turbine engine sensors 156B for sensing data indicative of one or more parameters of the gas turbine engine 102 (such as a rotational speed parameter the gas turbine engine 102, such as a rotational speed of the first shaft 120 and/or the second shaft 122, as well as, e.g., a compressor exit temperature, a turbine inlet temperature, a compressor exit pressure, a turbine inlet pressure, combustor dynamics, and other data that may be used to regulate operation of the gas turbine engine 102); and an electric propulsor sensor 156C configured for sensing data indicative of one or more parameters of the electric propulsor (such as rotational speed, output power, electric machine temperature, airflow flowrate through the propulsor, pressure ratio of the propulsor, etc.).

As will also be appreciated, the controller 158 is operably connected to each of the above sensors 156, and further is operably connected to various components of the power system 100 for controlling such components (such as the electric machine 104, the power load 106/electric propulsor, and the gas turbine engine 102/fuel delivery system 128).

More specifically, in at least certain embodiments the controller 158 of the control system 108 may be configured as one or more computing device(s) 158. The computing device(s) 158 can include one or more processor(s) 158A and one or more memory device(s) 158B. The one or more processor(s) 158A can include any suitable processing device, such as a microprocessor, microcontroller, integrated circuit, logic device, and/or other suitable processing device. The one or more memory device(s) 158B can include one or more computer-readable media, including, but not limited to, non-transitory computer-readable media, RAM, ROM, hard drives, flash drives, and/or other memory devices.

The one or more memory device(s) 158B can store information accessible by the one or more processor(s) 158A, including computer-readable instructions 158C that can be executed by the one or more processor(s) 158A. The instructions 158C can be any set of instructions that when executed by the one or more processor(s) 158A, cause the one or more processor(s) 158A to perform operations. In some embodiments, the instructions 158C can be executed by the one or more processor(s) 158A to cause the one or more processor(s) 158A to perform operations, such as any of the operations and functions for which the controller 158 and/or the computing device(s) 158 are configured, the operations for operating a power system 100 (e.g., method 400), as described herein, and/or any other operations or functions of the one or more computing device(s) 158. The instructions 158C can be software written in any suitable programming language or can be implemented in hardware. Additionally, and/or alternatively, the instructions 158C can be executed in logically and/or virtually separate threads on processor(s) 158A. The memory device(s) 158B can further store data 158D that can be accessed by the processor(s) 158A. For example, the data 158D can include data received from the various sensors 156.

The computing device(s) 158 can also include a network interface 158E used to communicate, for example, with the other components of the power system 100, including the sensors 156, electric machine 104, power load 106, gas turbine engine 102, fuel delivery system 128, etc. For example, in the embodiment depicted, as noted above, the power system 100 includes one or more sensors 156 for sensing data indicative of one or more parameters of the power system 100. The controller 158 is operably coupled to the one or more sensors 156 through, e.g., the network interface 158E, such that the controller 158 may receive the sensed data indicative of the various operating parameters during operation. Further, for the embodiment shown the controller 158 is operably coupled to the various components of the power system 100, such as the electric machine 104, gas turbine engine 102, fuel delivery system 128, power load 106, etc. In such a manner, the controller 158 may be configured to provide commands to such components, e.g., in response to the data sensed by the one or more sensors 156.

The network interface 158E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the exemplary power system 100, or rather, the exemplary propulsion system, described above with respect to FIG. 1 may be incorporated into any suitable vehicle. For example, referring now to FIG. 2, various vehicles as may incorporate the exemplary propulsion systems described above with reference to FIG. 1 are depicted. As shown, in certain exemplary embodiments, the exemplary propulsion system may be integrated into an aeronautical vehicle, such as an aircraft 200. Notably, for the exemplary aircraft shown in FIG. 2, the propulsion system includes one or more underwing mounted engines 202, such as turbofan jet engines. With such an exemplary embodiment, one or more of the underwing mounted turbine turbofan jet engines 202 may be the gas turbine engine 102 of the propulsion system 100 (e.g., gas turbine engine 102 of FIG. 1) driving an electric generator 104. The power load 106/electric propulsor may be mounted to an opposite wing of the aircraft 200, or alternatively, may be mounted to a fuselage 204 of the aircraft 200 proximate an aft end 206 of the aircraft 200, a vertical stabilizer 208 of the aircraft 200, or at any other suitable location.

Figure 2:
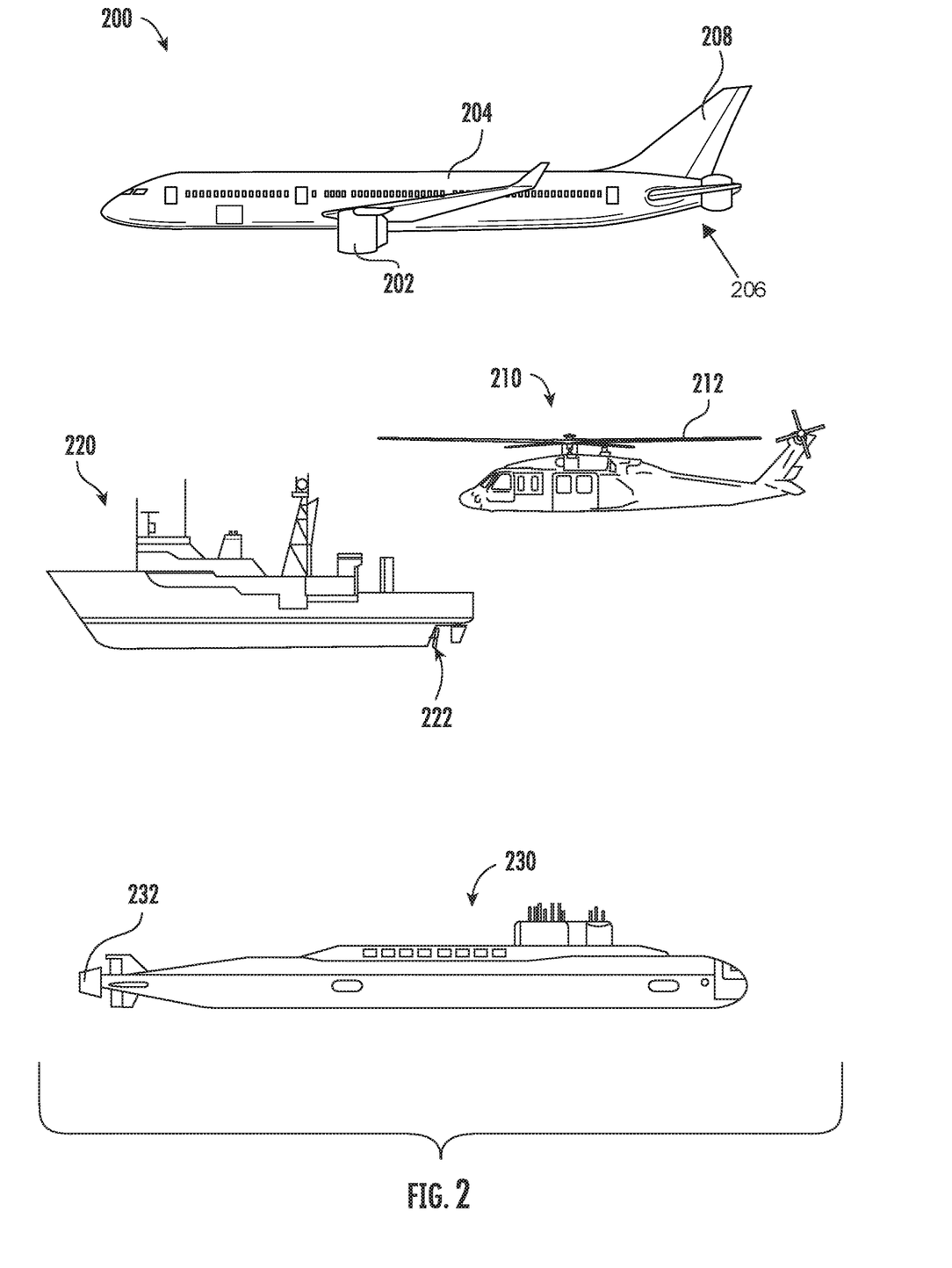
FIG. 2 is a schematic view of various vehicles that may incorporate the exemplary power system of FIG. 1.

Referring still FIG. 1, the propulsion system may alternatively be integrated into any other suitable aeronautical vehicle, such as a vertical takeoff and landing vehicle, such as a helicopter 210. With such an exemplary aspect, the propulsion system may utilize a turboshaft engine driving an electric generator (as is depicted in FIG. 1), and the power load 106/electric propulsor may be a main rotor 212 of the helicopter 210.

With further reference to FIG. 1, in still other exemplary aspects, the propulsion system may additionally, or alternatively, be incorporated into a nautical vehicle. For example, the propulsion system may be integrated into a ship 220 and/or a submarine 230. With these configurations, the propulsion system may again be configured in a manner similar to the embodiment described above with reference to FIG. 1, with the power load 106/electric propulsor being one or more of the propellers 222, 232 of the nautical vehicle (i.e., ship 220 and submarine 230, respectively).

It will further be appreciated, however, that in still other embodiments, the power system 100 may not necessarily be a propulsion system. For example, referring now to FIG. 3, a power system 100 in accordance with another exemplary embodiment of the present disclosure is depicted. The exemplary power system 100 depicted in FIG. 3 may be configured in a similar manner to the exemplary power system 100 described above with reference to FIG. 1. For example, the power system 100 generally includes a gas turbine engine 102, an electric machine 104 rotatable with the gas turbine engine 102, a power load 106 driven at least in part by the electrical power generated by the electric machine 104, and a control system 108.

Figure 3:
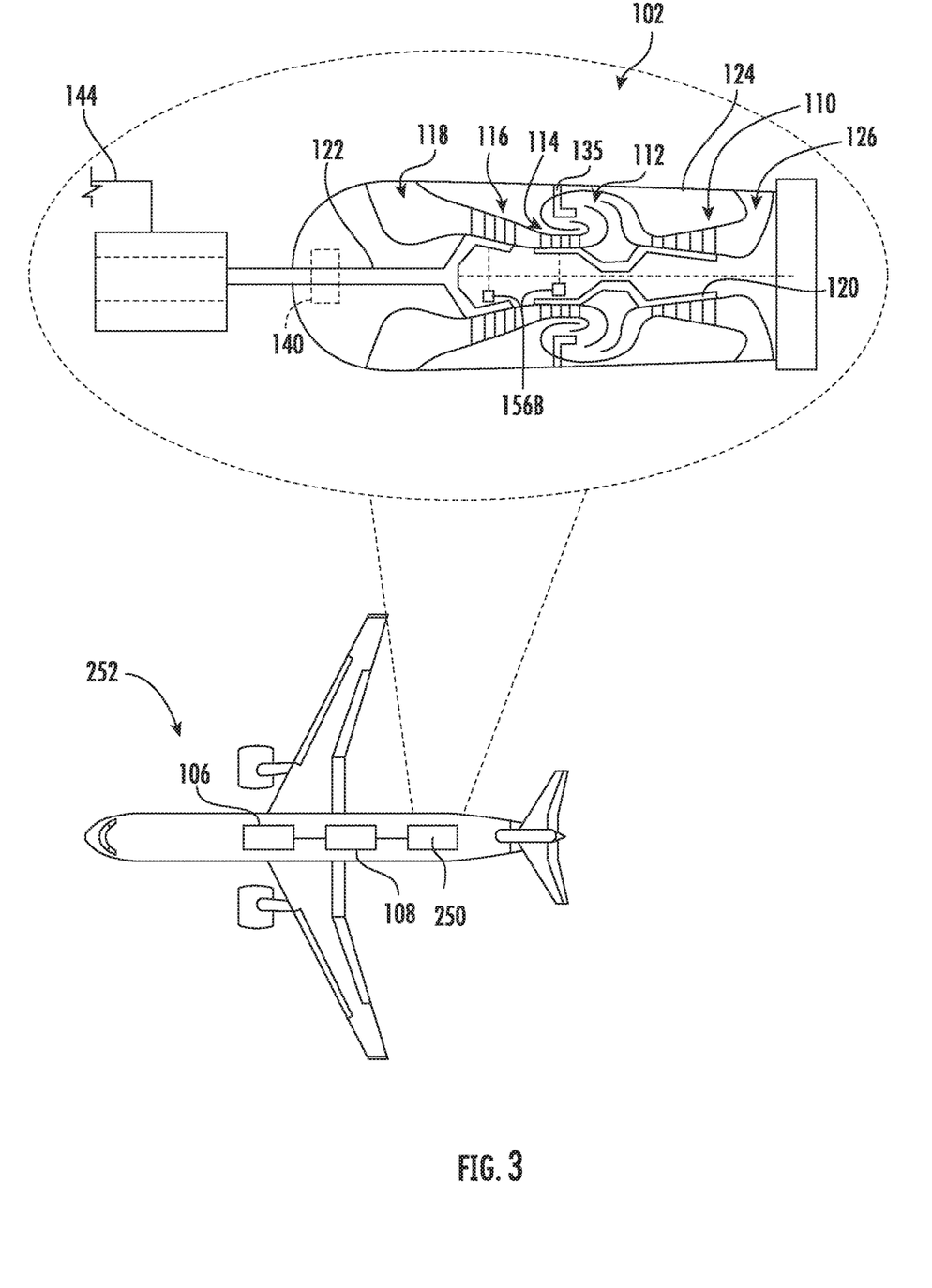
FIG. 3 is a schematic view of a power system in accordance with another exemplary embodiment of the present disclosure.

However, for the embodiment shown, the power load 106 is not an electric propulsor. Instead, the gas turbine engine 102 and electric machine 104 are configured as an auxiliary power unit 250 of an aircraft 252, and the power load 106 is a system of the aircraft 252. For example, the power load 106 may be an environmental control system for the aircraft 252. However, in other embodiments, the power load 106 may be any other suitable system of the aircraft 252. For example, when integrated into, e.g., a military aircraft, the power load 106 may be a military power load (such as a weapons system).

Figure 4:
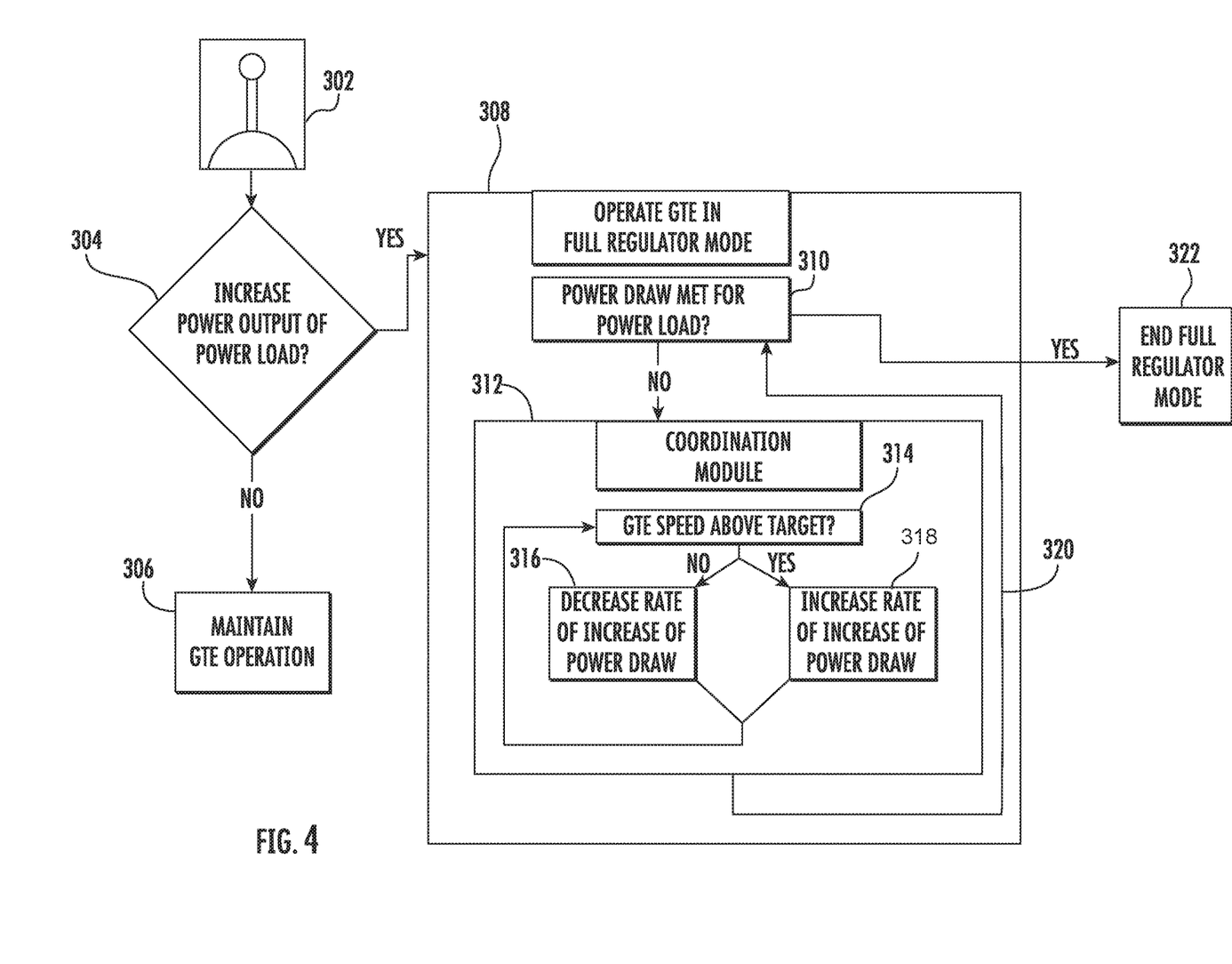
FIG. 4 is a schematic flow diagram of various operations of a power system in accordance with an exemplary aspect of the present disclosure.

Referring now to FIG. 4, a flow chart depicting operations of a power system in accordance with various exemplary aspects the present disclosure is depicted. The operations depicted in the flowchart of FIG. 4, and described below, may be utilized to control one or more the exemplary power systems described above with reference to FIGS. 1 through 3.

As is depicted, the flowchart includes at 302, receiving a command from an input device. More specifically, the input device is a user input device, such as a throttle of a vehicle. The input device may be used to receive the command (e.g., from a user or operator of the vehicle) indicative of a desired power output power for a power load of the power system (a command power output).

At 304, the flowchart may receive the command to operate the power load at the command output power and compare such command output power to a reference output power, such as a currently operating output power. If the command output power is equal to the reference output power, then, as is indicated at 306 the flowchart may maintain current gas turbine engine operations.

By contrast, if the flowchart determines at 304 that the command output power is greater than a reference output power, then the flowchart may at 308 operate the gas turbine engine in a full/maximum regulator mode. The maximum regulator mode refers to an operating mode of the gas turbine engine wherein it is operated at its quickest transient to power, or more specifically, operated to the greatest extent allowable by the various regulators of the gas turbine engine, such as the pressure regulators, temperature regulators, etc.

Operating the gas turbine engine in the full regulator mode at 308 includes at 310 determining if the current electric machine power draw is equal to an electric machine power draw necessary to operate the power load at the command output power. In the event the current electric machine power draw is less than the power draw necessary to operate the power load at the command output power, the flowchart increases the electric machine power draw from the gas turbine engine according to a coordination module 312. The coordination module 312 is configured to maintain a substantially constant gas turbine engine speed parameter, such as a substantially constant rotational speed of one or more shafts of the gas turbine engine. As such, the coordination module 312 determines at 314 if the gas turbine engine speed parameter is above a target gas turbine engine speed parameter (i.e., the desired, set gas turbine engine speed parameter). If the gas turbine engine speed parameter is not above the target gas turbine engine speed parameter as determined at 314, the flowchart at 316 decreases a rate of increase of power draw of the electric machine from the gas turbine engine. In such a manner, the coordination module 312 allows the gas turbine engine to "catch up" in the amount of power being produced, such that the gas turbine engine speed parameter may be maintained substantially constant. However, if the gas turbine engine speed parameter is above the target gas turbine engine speed parameter as determined at 314, the flowchart at 318 increases the rate of increase of a power draw of the electric machine from the gas turbine engine. In such a manner, the coordination module 312 prevents the gas turbine engine from over speeding and increases a speed at which the power load may provide the command output power.

As indicated at line 320, the flowchart further circles back to the determination at 310. Once the flowchart determines at 310 that the current electric machine power draw is equal to the electric machine power drawn necessary to operate the power load at the command output power, the flowchart at 322 ends the operation of the gas turbine engine in the full regulator mode. At this point, the flowchart may, although not depicted, control the power system to achieve a steady-state operating condition.

It will be appreciated, however, that the exemplary control operations depicted in FIG. 4 are by way of example only. In other exemplary embodiments the control operations may include any other suitable steps, modules, features, etc. For example, although the control operations are depicted including a feedback loop at the coordination module 312, and further for determining if the power draw is met for the power load at 310, in other exemplary aspects, the operations may instead use any other suitable control scheme, such as one or more predictive controls, etc.

Figure 5:
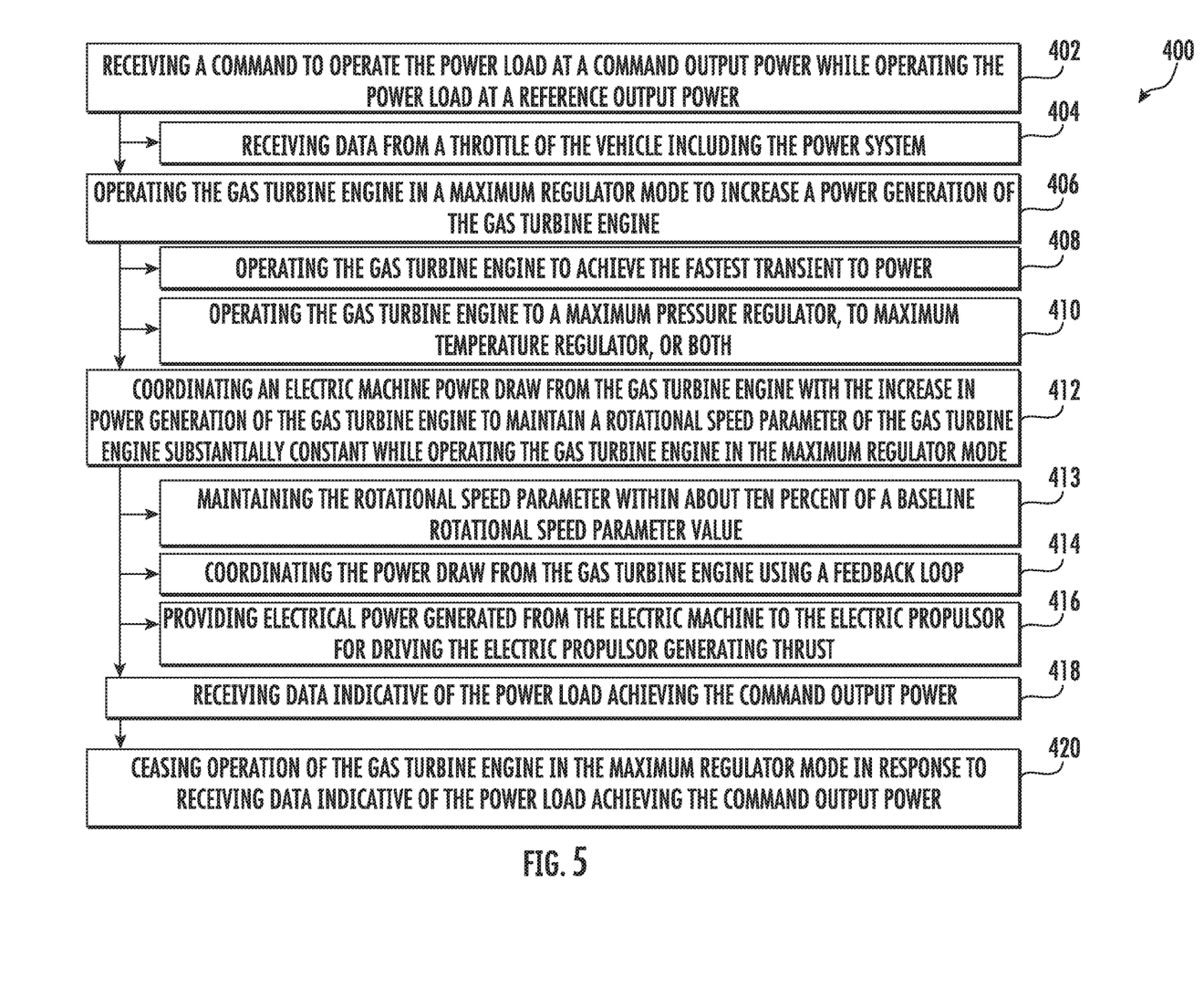
FIG. 5 is a flow diagram of a method for operating a power system in accordance with an exemplary aspect of the present disclosure.

Referring now to FIG. 5, a method 400 for operating a power system in accordance with an exemplary aspect of the present disclosure is depicted. The method 400 may be utilized with one or more of the exemplary power systems described above with reference to FIGS. 1 through 3, and further may operate in a manner similar to the operations described above with reference to FIG. 4. In such a manner, it will be appreciated that the power system may generally include a gas turbine engine, an electric machine rotatable with the gas turbine engine, and a power load driven at least in part by the electric power generated by the electric machine. Further, it will be appreciated that the exemplary method 400 may be performed through a control system including a controller (such as the exemplary control system a controller described above with reference to FIG. 1). In such a manner, in at least certain exemplary aspects, the method 400 may be a computer-implemented method.

The method 400 generally includes at (402) receiving a command to operate the power load at a command output power while operating the power load at a reference output power. In at least certain exemplary aspects, the command output power may be greater than the reference output power. For example, the reference output power may be a power level less than about 25 percent of a maximum output power of the power load, whereas the command output power of the power load may be a power level greater than about 75 percent of the maximum output power of the power load.

Further, for the exemplary aspect of the method 400 depicted in FIG. 5, receiving the command to operate the power load at the command output power at (402) includes at (404) receiving data from a throttle of the vehicle including the power system. Notably, receiving data from the throttle of the vehicle including the power system at (404) may include receiving data from the throttle being operated by a pilot or other operator of the vehicle.

For example, in certain exemplary aspects, the vehicle may be an aeronautical vehicle, the power system may be a propulsion system for the aeronautical vehicle, the power load may be an electric propulsor for providing thrust for the aeronautical vehicle, and the gas turbine engine may be one of a turboshaft engine, turbojet engine, a turbofan engine, or a turboprop engine. Alternatively, however, in other exemplary aspects, the vehicle may be a nautical vehicle, the power system may be a propulsion system for the nautical vehicle, the gas turbine engine may be a turboshaft engine, and the power load may be an electric propeller for creating thrust for the nautical vehicle. Additionally or alternatively, the power system may not necessarily be a propulsion system for vehicle. For example, in other exemplary aspects, the power system may be an auxiliary power unit of an aeronautical vehicle, the gas turbine engine may be a turboshaft engine, and the power load may be a system of the aeronautical vehicle, such as an environmental control system or other non-thrust producing system or power load of the aeronautical vehicle. However, in other exemplary aspects, the gas turbine engine and/or power load of the power system may be configured in still other suitable manners. For example, in other exemplary aspects, the power load may be a military power load.

Referring still to the exemplary aspect of the method 400 depicted in FIG. 5, the exemplary aspect depicted further includes operating the gas turbine engine in a maximum regulator mode to increase a power generation of the gas turbine engine when the command output power is greater than the reference output power or in a minimum regulator mode to decrease the power generation of the gas turbine engine when the command output power is less than the reference output power. More specifically, for the exemplary aspect depicted, the method 400 includes at (406) operating the gas turbine engine in the maximum regulator mode to increase the power generation of the gas turbine engine. Operating the gas turbine engine in the maximum regulator mode at (406) includes at (408) operating the gas turbine engine to achieve the fastest transient to power, and more specifically includes at (410) operating the gas turbine engine to a maximum pressure regulator, to maximum temperature regulator, or both. In such a manner, the gas turbine engine may be operated to the greatest extent allowable by the various regulators of the gas turbine engine (the regulators preventing operation of the gas turbine engine above temperature limits, pressure limits, etc.).

The exemplary method 400 further includes at (412) coordinating an electric machine power draw from the gas turbine engine with the increase in power generation of the gas turbine engine to maintain a rotational speed parameter of the gas turbine engine substantially constant while operating the gas turbine engine in the maximum regulator mode at (408). In at least certain exemplary aspects, the rotational speed parameter may be indicative of a rotational speed of one or more shafts of the gas turbine engine. Further, in at least certain exemplary aspects, coordinating the electric machine power draw from the gas turbine engine with the increase in power generation of the gas turbine engine at (412) may include at (413) maintaining the rotational speed parameter within about ten percent of a baseline rotational speed parameter value (e.g., a set value, a desired value, etc.), such as within about five percent of the baseline rotational speed parameter value. The baseline rotational speed parameter value may correspond to a rotational speed at which the gas turbine engine operates at a maximum efficiency.

Further, it will be appreciated that coordinating the electric machine power draw from the gas turbine engine at (412) may be accomplished using any suitable control scheme. For example, in at least certain exemplary aspects, such as the exemplary aspect depicted, coordinating the electric machine power draw from the gas turbine engine with the increase in power generation of the gas turbine engine to maintain the rotational speed parameter of the gas turbine engine substantially constant at (412) includes at (414) coordinating the power draw from the gas turbine engine using a feedback loop. (See also coordination module 312 and the flowchart 300 of FIG. 4.)

As noted, in certain exemplary aspects, the power load may be an electric propulsor driven by the electric machine. With such an exemplary aspect, coordinating the electric machine power draw from the gas turbine engine with the increase in power generation of the gas turbine engine at (412) includes at (416) providing electrical power generated from the electric machine to the electric propulsor for driving the electric propulsor generating thrust. For example, the method 400 may provide all, or substantially all, of the electric power generated with the electric machine to the electric propulsor for driving the electric propulsor generating thrust at (416). With such an exemplary aspect, the command output power may be (or correspond to) a desired thrust to be generated by the electric propulsor.

Further, referring still to FIG. 5, the exemplary method 400 further includes at (418) receiving data indicative of the power load achieving the command output power, and at (420) ceasing operation of the gas turbine engine in the maximum regulator mode in response to receiving data indicative of the power load achieving the command output power at (418).

It will be appreciated, however, that in other exemplary aspects of the method 400, the command output power may be less than the reference output power (e.g., the reference output power may be a power level greater than about 75% of a maximum output power of the power load, and wherein the command output power of the power load is a power level less than about 25% of a maximum output power of the power load). In such an exemplary aspect, operating the gas turbine engine in a maximum regulator mode or in a minimum regulator mode may include operating the gas turbine in the minimum regulator mode to decrease the power generation of the gas turbine engine. With such an exemplary aspect, wherein operating the gas turbine engine in the minimum regulator mode to decrease the power generation of the gas turbine engine may further include operating the gas turbine engine to a minimum pressure regulator, to a minimum temperature regulator, or both, and further may include operating the gas turbine engine to achieve the fastest transient from power.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power system comprising a gas turbine engine, an electric machine rotatable with the gas turbine engine, and a power load driven at least in part by electrical power generated by the electric machine, the method comprising:
   receiving a command to operate the power load at a command output power while operating the power load at a reference output power;
   operating the gas turbine engine in a maximum regulator mode to increase a power generation of the gas turbine engine when the command output power is greater than the reference output power or in a minimum regulator mode to decrease the power generation of the gas turbine engine when the command output power is less than the reference output power; and
   coordinating an electric machine power draw from the gas turbine engine with a change in power generation of the gas turbine engine to maintain a rotational speed parameter of the gas turbine engine substantially constant while operating the gas turbine engine in the maximum regulator mode or in the minimum regulator mode.

2. The method of claim 1, wherein the command output power is greater than the reference output power.

3. The method of claim 2, wherein the reference output power is a power level less than about 25% of a maximum output power of the power load, and wherein the command output power of the power load is a power level greater than about 75% of a maximum output power of the power load.

4. The method of claim 1, wherein operating the gas turbine engine in the maximum regulator mode or in the minimum regulator mode comprises operating the gas turbine engine in the maximum regulator mode, and wherein operating the gas turbine engine in the maximum regulator mode to increase the power generation of the gas turbine engine comprises operating the gas turbine engine to a maximum pressure regulator, to a maximum temperature regulator, or both.

5. The method of claim 1, wherein operating the gas turbine engine in the maximum regulator mode or in the minimum regulator mode comprises operating the gas turbine engine in the maximum regulator mode, and wherein operating the gas turbine engine in the maximum regulator mode to increase the power generation of the gas turbine engine comprises operating the gas turbine engine to achieve the fastest transient to power.

6. The method of claim 1, wherein the power load is an electric propulsor driven by the electric machine, and wherein coordinating the electric machine power draw from the gas turbine engine with the change in power generation of the gas turbine engine comprises providing electrical power generated from the electric machine to the electric propulsor for driving the electric propulsor and generating thrust.

7. The method of claim 1, wherein receiving the command to operate the power load at the command output power comprises receiving data from a throttle of a vehicle including the power system.

8. The method of claim 7, wherein the vehicle is an aeronautical vehicle, wherein the power system is a propulsion system for the aeronautical vehicle, wherein the power load is an electric propulsor, and wherein the gas turbine engine is one of a turboshaft engine, a turbojet engine, a turbine fan engine, or a turboprop engine.

9. The method of claim 7, wherein the vehicle as a nautical vehicle, wherein the power system is a propulsion system for the nautical vehicle, wherein the gas turbine engine is a turboshaft engine, and wherein the power load is an electric propeller.

10. The method of claim 1, wherein the power load is a military power load.

11. The method of claim 1, wherein the power system is an auxiliary power unit of an aeronautical vehicle, wherein the gas turbine engine is a turboshaft engine, and wherein the power load is a system of the aeronautical vehicle.

12. The method of claim 1, wherein coordinating the electric machine power draw from the gas turbine engine with the change in power generation of the gas turbine engine to maintain the rotational speed parameter of the gas turbine engine substantially constant comprises coordinating the power draw from the gas turbine engine through a feedback loop.

13. The method of claim 1, wherein the command output power is greater than the reference output power, and wherein the method further comprises:
   receiving data indicative of the power load achieving the command output power; and
   ceasing operation of the gas turbine engine in the maximum regulator mode or in the minimum regulator mode in response to receiving data indicative of the power load achieving the command output power.

14. The method of claim 1, wherein the rotational speed parameter is indicative of a rotational speed of one or more shafts of the gas turbine engine.

15. A power system for a vehicle comprising:
   a gas turbine engine;

an electric machine rotatable with the gas turbine engine, the gas turbine engine configured to rotate the electric machine to generate electrical power during at least certain operations;
a power load electrically coupled to the electric machine; and
a controller operable with the gas turbine engine, the electric machine, and the power load, the controller comprising one or more processors and a data storage, the data storage storing instructions that when executed by the one or more processors cause the controller to perform functions, the functions comprising
receiving a command to operate the power load at a command output power while operating the power load at a reference output power;
operating the gas turbine engine in a maximum regulator mode to increase a power generation of the gas turbine engine when the command output power is greater than the reference output power or in a minimum regulator mode to decrease the power generation of the gas turbine engine when the command output power is less than the reference output power; and
coordinating an electric machine power draw from the gas turbine engine with a change in power generation of the gas turbine engine to maintain a rotational speed parameter of the gas turbine engine substantially constant while operating the gas turbine engine in the maximum regulator mode or in the minimum regulator mode.

16. The power system of claim 15, wherein the command output power is greater than the reference output power.

17. The power system of claim 16, wherein the reference output power is a power level less than about 25% of a maximum output power of the power load, and wherein the command output power of the power load is a power level greater than about 75% of a maximum output power of the power load.

18. The power system of claim 15, wherein operating the gas turbine engine in the maximum regulator mode or in the minimum regulator mode comprises operating the gas turbine engine in the maximum regulator mode, and wherein operating the gas turbine engine in the maximum regulator mode to increase the power generation of the gas turbine engine comprises operating the gas turbine engine to a maximum pressure regulator, to a maximum temperature regulator, or both.

19. The power system of claim 15, wherein receiving the command to operate the power load at the command output power comprises receiving data from a throttle of a vehicle including the power system.

20. The power system of claim 19, wherein the vehicle is an aeronautical vehicle, wherein the power system is a propulsion system for the aeronautical vehicle, wherein the power load is an electric propulsor, and wherein the gas turbine engine is one of a turboshaft engine, a turbojet engine, a turbine fan engine, or a turboprop engine.

* * * * *